US012715689B2

(12) United States Patent
Liu

(10) Patent No.: US 12,715,689 B2
(45) Date of Patent: Aug. 25, 2026

(54) CONTAINER HANDLING METHOD EMPLOYING DENSE STORAGE

(71) Applicant: BEIJING GEEKPLUS TECHNOLOGY CO. LTD, Beijing (CN)

(72) Inventor: Kai Liu, Beijing (CN)

(73) Assignee: BEIJING GEEKPLUS TECHNOLOGY CO. LTD, Beijing (CN)

( * ) Notice: Subject to any disclaimer, the term of this patent is extended or adjusted under 35 U.S.C. 154(b) by 1212 days.

(21) Appl. No.: 17/639,788

(22) PCT Filed: Dec. 21, 2020

(86) PCT No.: PCT/CN2020/137952
§ 371 (c)(1),
(2) Date: Mar. 2, 2022

(87) PCT Pub. No.: WO2021/129563
PCT Pub. Date: Jul. 1, 2021

(65) Prior Publication Data

US 2022/0332502 A1 Oct. 20, 2022

(30) Foreign Application Priority Data

Dec. 26, 2019 (CN) ......................... 201911368462.8

(51) Int. Cl.
*B65G 1/04* (2006.01)
*B25J 9/16* (2006.01)
*B65G 1/137* (2006.01)

(52) U.S. Cl.
CPC .......... *B65G 1/0492* (2013.01); *B25J 9/1664* (2013.01); *B25J 9/1682* (2013.01); *B65G 1/1373* (2013.01); *B65G 2201/0235* (2013.01)

(58) Field of Classification Search
CPC .. B65G 1/0435; B65G 1/0492; B65G 1/1373; B65G 1/1375; B65G 1/1378;
(Continued)

(56) References Cited

U.S. PATENT DOCUMENTS 4,492,504 A * 1/1985 Hainsworth .............. B66F 9/07
414/280
11,104,003 B2 * 8/2021 Sun ........................ G06Q 10/08
(Continued)

FOREIGN PATENT DOCUMENTS

CN 106429148 A 2/2017
CN 106458444 A 2/2017
(Continued)

OTHER PUBLICATIONS

International Search Report dated Mar. 22, 2021 from corresponding PCT Application No. PCT/CN2020/137952.
(Continued)

*Primary Examiner* — Timothy R Waggoner
(74) *Attorney, Agent, or Firm* — Maschoff Brennan

(57) ABSTRACT

A container handling method employing dense storage comprises: when at least one blocking container blocking removal of a target container is stored on storage shelf, container fetching mechanism of a robot fetching at least one blocking container from storage shelf, and temporarily storing same on buffer mechanism of robot; and container fetching mechanism of robot fetching target container from storage shelf, storing same on buffer mechanism of robot, fetching at least one blocking container from buffer mechanism of robot, and placing same at an original storage position thereof, an original storage position of target container, or other vacant storage positions on storage shelf; when buffer mechanism of robot is full due to at least one blocking container, container fetching mechanism of robot (Continued)

fetching target container from storage shelf, and keeping same on container fetching mechanism of robot.

20 Claims, 11 Drawing Sheets

(58) Field of Classification Search
CPC ........ B65G 1/0421; B65G 1/137; B65G 1/04; B65G 2201/0235; G06Q 10/087; G06Q 10/08; G06Q 10/0832; B25J 9/1664; B25J 9/1682; B25J 9/1679; B25J 11/00; G05B 2219/45056; G05B 19/41895
See application file for complete search history.

(56) References Cited

U.S. PATENT DOCUMENTS

2019/0352092 A1* 11/2019 Zheng .................. B65G 1/0435
2020/0109007 A1 4/2020 Li et al.

FOREIGN PATENT DOCUMENTS

CN 107226310 A * 10/2017 ........... B65G 1/0492
CN 107235276 A 10/2017
CN 109178743 A 1/2019
CN 110182529 A 8/2019
CN 110498172 A 11/2019
CN 111137610 A 5/2020
JP S5656402 A 5/1981
JP 2019018983 A 2/2019
WO 2013167907 A1 11/2013
WO 2018082749 A1 5/2018
WO 2018218620 A1 12/2018

OTHER PUBLICATIONS

European Search Report dated Nov. 16, 2022 from European Application No. 20905037.6.

* cited by examiner

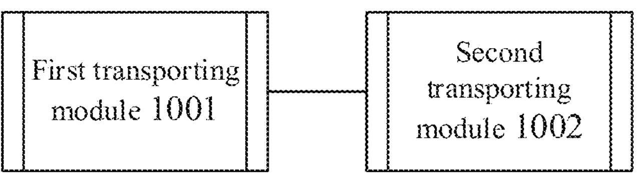
Figure 10
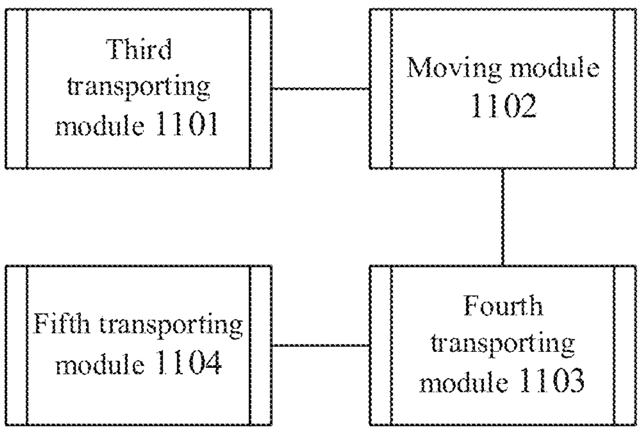
Figrue 11

CONTAINER HANDLING METHOD EMPLOYING DENSE STORAGE

The present disclosure claims priority to Chinese Patent Application No. 201911368462.8, titled "CONTAINER HANDLING METHOD EMPLOYING DENSE STORAGE", filed Dec. 26, 2019 with the National Intellectual Property Administration, PRC, which is incorporated herein by reference in its entirety.

FIELD

The present disclosure relates to the technical field of warehousing and logistics, and in particular to a container transporting method based on dense storage.

BACKGROUND

With the continuous advancement of urbanization, spaces in urban area have become fewer and more expensive, and housing rents and logistics costs are also on the increase. Therefore, higher requirements are imposed on the storage capacity of existing logistics warehouses. However, the existing logistics warehouses mainly use attic multi-layer container storage solutions, which not only have low storage densities and poor storage capacities, resulting in high logistics costs. Therefore, a problem to be solved urgently is how to increase the storage density and the storage capacity in limited storage space to reduce logistics costs.

SUMMARY

In view of this, a container transporting method based on dense storage is provided according to embodiments of the present disclosure, to solve the technical defects in the conventional art.

According to a first aspect of the embodiments of the present disclosure, a container transporting method based on dense storage is provided, which includes:

picking-up, in a case that at least one blocking container that blocks pickup of a target container is stored on a storage rack, the at least one blocking container from the storage rack by a container pickup mechanism of a robot and temporarily storing the at least one blocking container on a cache mechanism of the robot, where the target container is one of at least one container to be picked up; and picking-up, by the container pickup mechanism of the robot, the target container from the storage rack and storing the target container on the cache mechanism of the robot, and sequentially picking-up the at least one blocking container from the cache mechanism of the robot and placing the blocking container on the storage rack at an original storage position of the blocking container, an original storage position of the target container or an empty storage position; or picking-up, in a case that the cache mechanism of the robot is entirely occupied by the at least one blocking container, the target container by the container pickup mechanism of the robot from the storage rack and keeping the target container on the container pickup mechanism of the robot.

In an embodiment, the method further includes:

transporting, by the robot, the target container from a current position of the robot to a workstation through a robot passage, where in the case that the cache mechanism of the robot is entirely occupied by the at least one blocking container, the at least one blocking container and the target container are both transported from the current position of the robot to the workstation by the robot through the robot passage.

In an embodiment, the method further includes:

recording, in a case that a position of the target container changes, a new storage position of the target container and updating a correspondence between the new storage position of the target container and an identity of the target container; and recording, in a case that a position of the blocking container changes, a new storage position of the blocking container and updating a correspondence between the new storage position of the blocking container and an identity of the blocking container.

According to a second aspect of the embodiments of the present disclosure, a container transporting method based on dense storage is provided, which includes:

picking-up, in a case that at least one blocking container that blocks pickup of a target container is stored on a storage rack, the at least one blocking container from the storage rack by a container pickup mechanism of at least one first robot, where the target container is one of at least one container to be picked up;

moving the at least one first robot through a robot passage, or moving the at least one first robot to a cache position;

picking-up, by a container pickup mechanism of a second robot, the target container from the storage rack, and transporting the target container from a current position of the second robot to a workstation; and returning, the at least one first robot, to a position of the storage rack, and placing the at least one blocking container on the storage rack at an original storage position of the blocking container, an original storage position of the target container or an empty storage position.

In an embodiment, the picking-up the at least one blocking container from the storage rack by a container pickup mechanism of at least one first robot includes:

sequentially picking-up, in a case that the at least one first robot has a cache mechanism, the at least one blocking container from the storage rack by the container pickup mechanism of the at least one first robot, and sequentially storing the at least one blocking container on the cache mechanism of the at least one first robot until the cache mechanism of the at least one first robot is entirely occupied; and picking-up, in a case that none of the at least one first robot has a cache mechanism, one of the at least one blocking container from the storage rack by the container pickup mechanism of the at least one first robot and keeping the blocking container on the container pickup mechanism.

In an embodiment, the picking-up, by a container pickup mechanism of a second robot, the target container from the storage rack includes:

picking-up, in a case that the second robot has a cache mechanism, the target container from the storage rack by the container pickup mechanism of the second robot and storing the target container on the cache mechanism of the second robot picking-up, in a case that the second robot does not have a cache mechanism, the target container from the storage rack by the container pickup mechanism of the second robot and keeping the target container on the container pickup mechanism.

In an embodiment, the method further includes:

recording, in a case that a position of the target container changes, a new storage position of the target container and updating a correspondence between the new storage position of the target container and an identity of the target container; and recording, in a case that a position of the blocking container changes, a new storage position of the blocking container and updating a correspondence between the new storage position of the blocking container and an identity of the blocking container.

According to a third aspect of the embodiments of the present disclosure, a container transporting method based on dense storage is provided, which includes:

placing, in a case that at least one blocking container that blocks return of a target container is stored on a storage rack, the at least one blocking container from an original storage position of the blocking container on the storage rack to a cache position by a container pickup mechanism of a robot, where the target container is one of at least one container to be returned; and picking-up, by the container pickup mechanism of the robot, the target container from a cache mechanism of the robot and placing the target container at a return position on the storage rack.

In an embodiment, the number of the at least one blocking container is one, and the placing the at least one blocking container from an original storage position of the blocking container on the storage rack to a cache position by a container pickup mechanism of a robot includes:

placing, by the container pickup mechanism of the robot, the blocking container from the original storage position of the blocking container on the storage rack to an original storage position of the target container, where the picking-up, by the container pickup mechanism of the robot, the target container from a cache mechanism of the robot and placing the target container at a return position on the storage rack includes:

picking-up, by the container pickup mechanism of the robot, the target container from the cache mechanism of the robot and placing the target container at the original storage position of the blocking container on the storage rack.

In an embodiment, the number of the at least one blocking container is at least two, and the placing the at least one blocking container from an original storage position of the blocking container on the storage rack to a cache position by a container pickup mechanism of a robot includes:

sequentially translating, by the container pickup mechanism of the robot, the at least two blocking containers from an original storage position of the blocking container on the storage rack by one storage position in a depth direction of the storage rack, where the picking-up, by the container pickup mechanism of the robot, the target container from a cache mechanism of the robot and placing the target container at a return position on the storage rack includes:

picking-up, by the container pickup mechanism of the robot, the target container from the cache mechanism of the robot and placing the target container on the storage rack at an empty storage position among original storage positions of the at least two blocking containers.

In an embodiment, the placing the at least one blocking container from an original storage position of the blocking container on the storage rack to a cache position by a container pickup mechanism of a robot includes:

picking-up, by the container pickup mechanism of the robot, the at least one blocking container from the original storage position of the blocking container on the storage rack and placing the blocking container on the cache mechanism of the robot;

where the picking-up, by the container pickup mechanism of the robot, the target container from a cache mechanism of the robot and placing the target container at a return position on the storage rack includes:

picking-up, by the robot, the target container from the cache mechanism of the robot and placing the target container at an original storage position of the target container on the storage rack.

In an embodiment, after the picking-up, by the container pickup mechanism of the robot, the target container from the cache mechanism of the robot and placing the target container at an original storage position of the target container on the storage rack, the method further includes:

sequentially picking-up, by the container pickup mechanism of the robot, the at least one blocking container from the cache mechanism of the robot and placing the blocking container at the original storage position of the blocking container on the storage rack.

In an embodiment, the method further includes:

recording, in a case that a position of the target container changes, a new storage position of the target container and updating a correspondence between the new storage position of the target container and an identity of the target container; and recording, in a case that a position of the blocking container changes, a new storage position of the blocking container and updating a correspondence between the new storage position of the blocking container and an identity of the blocking container.

According to a fourth aspect of the embodiments of the present disclosure, a container transporting method based on dense storage is provided, which includes:

picking-up, in a case that at least one blocking container that blocks return of a target container is stored on a storage rack, the at least one blocking container from the storage rack by a container pickup mechanism of at least one first robot and placing the at least one blocking container at a cache position; and placing, by a container pickup mechanism of a second robot carrying the target container, the target container at a return position on the storage rack.

In an embodiment, the number of the at least one blocking container is one, and the number of the at least one first robot is one, and the picking-up the at least one blocking container from the storage rack by a container pickup mechanism of at least one first robot and placing the at least one blocking container at a cache position includes:

placing, by the container pickup mechanism of the first robot, the blocking container from an original storage position of the blocking container on the storage rack to an original storage position of the target container;

where the placing, by a container pickup mechanism of a second robot carrying the target container, the target container at a return position on the storage rack includes:

picking-up, in a case that the second robot has a cache mechanism, the target container from the cache mechanism of the second robot by the container pickup mechanism of the second robot, and placing the target container at the original storage position of the blocking container on the storage rack; and directly placing, in a case that the second robot does not have a cache mechanism and the target container is located on the container pickup mechanism of the second robot, the target container at the original storage position of the blocking container on the storage rack by the container pickup mechanism of the second robot.

In an embodiment, the number of the at least one blocking container is at least two, the number of the at least one first robot is one, and the picking-up the at least one blocking container from the storage rack by a container pickup mechanism of at least one first robot and placing the at least one blocking container at a cache position includes:

sequentially translating, by the container pickup mechanism of the first robot, the at least two blocking containers from an original storage position of the blocking container on the storage rack by one storage position in a depth direction of the storage rack, where the placing, by a container pickup mechanism of a second robot carrying the target container, the target container at a return position on the storage rack includes:

picking-up, in a case that the second robot has a cache mechanism, the target container from the cache mechanism of the second robot by the container pickup mechanism of the second robot, and placing the target container at one of original storage positions of the at least two blocking containers on the storage rack; and directly placing, in a case that the second robot does not have a cache mechanism and the target container is located on the container pickup mechanism of the second robot, the target container on an empty storage position among original storage positions of the at least two blocking containers on the storage rack by the container pickup mechanism of the second robot.

In an embodiment, the picking-up the at least one blocking container from the storage rack by a container pickup mechanism of at least one first robot and placing the at least one blocking container at a cache position includes:

picking-up, in a case that none of the at least one first robot has a cache mechanism, the at least one blocking container from the storage rack by the container pickup mechanism of a respective one of the at least one first robot respectively and keeping the blocking container on the container pickup mechanism of the first robot; and picking-up, in a case that the at least one first robot has a cache mechanism, the at least one blocking container from the storage rack by the container pickup mechanism of a respective one of the at least one first robot and placing the blocking container on the cache mechanism of the first robot, where the placing, by a container pickup mechanism of a second robot carrying the target container, the target container at a return position on the storage rack includes:

picking-up, in a case that the second robot has a cache mechanism, the target container from the cache mechanism of the second robot by the container pickup mechanism of the second robot and placing the target container at an original storage position of the target container on the storage rack; and directly placing, in a case that the second robot does not have a cache mechanism and the target container is located on the container pickup mechanism of the second robot, the target container at the original storage position of the target container on the storage rack by the container pickup mechanism of the second robot.

In an embodiment, after the placing the target container at the original storage position of the target container on the storage rack by the container pickup mechanism of the second robot, the method further includes:

placing, in a case that none of the at least one first robot has a cache mechanism, the at least one blocking container on the storage rack at an original storage position of the blocking container or an empty storage position by the container pickup mechanism of a respective one of the at least one first robot; and picking-up, in a case that the at least one first robot has a cache mechanism, the at least one blocking container from the cache mechanism of a respective one of the at least one first robot by the container pickup mechanism of the first robot and placing the blocking container on the storage rack at the original storage position of the blocking container or an empty storage position.

In an embodiment, the method further includes:

recording, in a case that a position of the target container changes, a new storage position of the target container and updating a correspondence between the new storage position of the target container and an identity of the target container; and recording, in a case that a position of the blocking container changes, a new storage position of the blocking container and updating a correspondence between the new storage position of the blocking container and an identity of the blocking container.

According to the present disclosure, at least four columns of storage racks are arranged, to form a warehousing logistics manner with dense storage of containers, such that the number of effective containers and the size of effective storage space are greatly increased, thereby improving the storage density and storage capacity of a size-fixed storage space, thus reducing the cost of warehousing and logistics. Accordingly, a container transporting method is further provided according to the present disclosure, which is applicable for transporting containers and removing obstacles under intense storage, multiple container pickup logics and container return logics are adopted, such that the reliability of the warehousing system based on intense storage can be ensured, thereby improving the efficiency of logistics transportation and reducing logistics costs.

BRIEF DESCRIPTION OF THE DRAWINGS

FIG. 10 is a schematic structural diagram of a container transporting device based on dense storage according to an embodiment of the present disclosure;

FIG. 11 is a schematic structural diagram of a container transporting device based on dense storage according to an embodiment of the present disclosure;

DETAILED DESCRIPTION OF EMBODIMENTS

Figure 1:
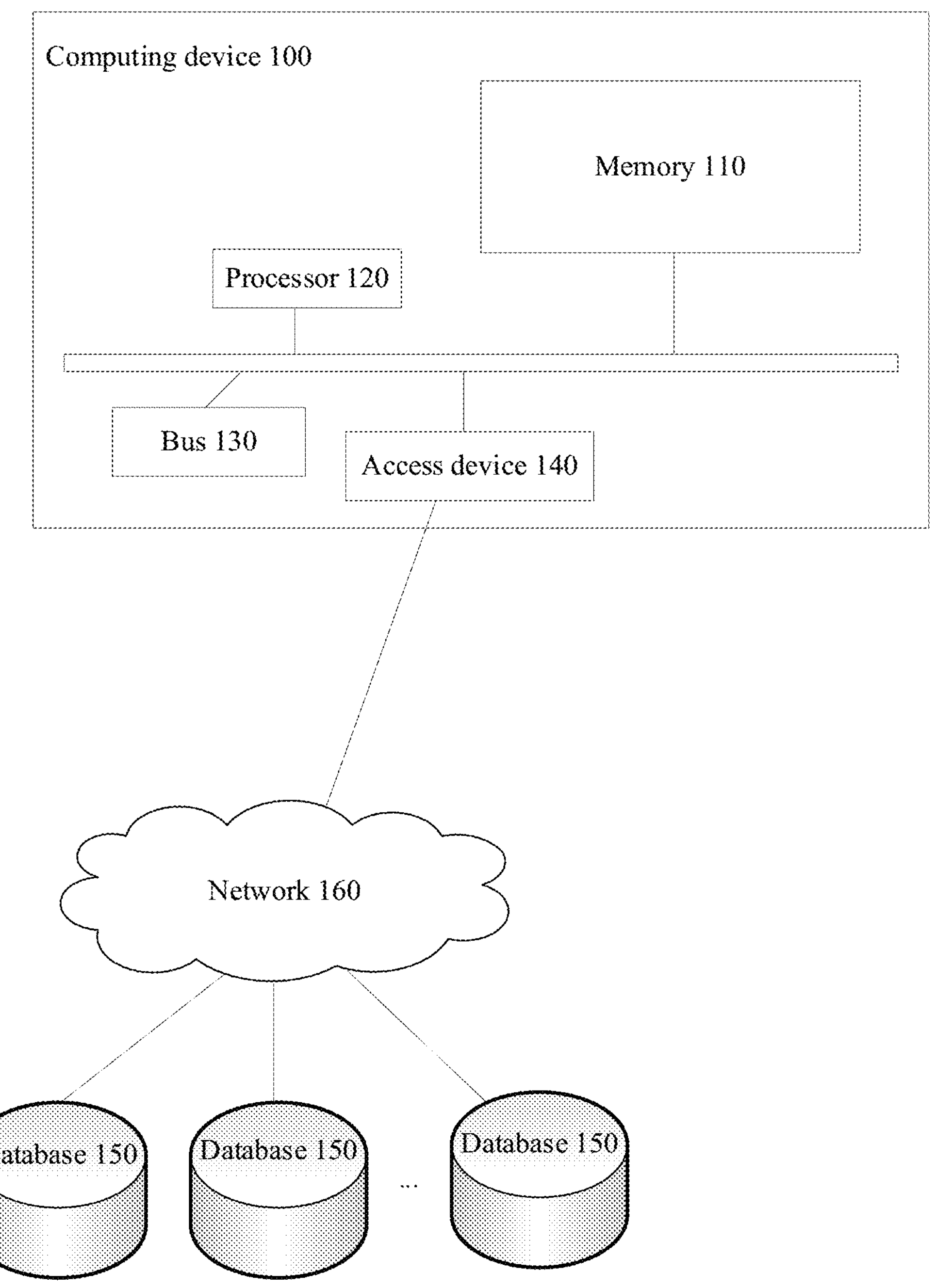
FIG. 1 is a structural block diagram of a computing device according to an embodiment of the present disclosure.

Many specific details are explained in the following description, to fully understand the present disclosure. However, the present disclosure may be implemented in many ways other than those described herein, and those skilled in the art may make similar extensions without violating the connotation of the present disclosure. Therefore, the present disclosure is not limited to embodiments disclosed below.

The terms used in one or more embodiments of the present disclosure are only for the purpose of describing the specific embodiments, and are not intended to limit the one or more embodiments of the present disclosure. The singular forms of “a”, “said” and “the” in the one or more embodiments and the claims of the present disclosure are also intended to include plural forms, unless being clearly indicated by other meanings in the context. It should also be understood that the term “and/or” in the one or more embodiments of the present disclosure refers to and includes any or all possible combinations of one or more associated listed items.

It is to be understood that although the terms “first”, “second”, and the like may be used to describe various kind of information in one or more embodiments of the present disclosure, the information should not be limited to these terms. These terms are only used to distinguish the same kind of information from each other. For example, without departing from the scope of one or more embodiments of the present disclosure, “the first” may also be referred to as “the second”, and similarly, “the second” may also be referred to as “the first”. Depending on the context, the word “if” used herein may be interpreted as “when” or “in a case that” or “in response to a determination”.

First, the terms involved in one or more embodiments of the present disclosure are explained.

A mobile robot is an automated Guided Vehicle (AGV), which refers to a transportation vehicle equipped with electromagnetic or optical automatic guidance devices, and is capable of traveling in a prescribed guidance path under safety protection and various transfer functions.

A high rack refers to a rack with a height of more than 5 meters according to the customary definition of the storage equipment industry, including beam pallet racks, through-type racks, push-back racks, double-depth racks, narrow aisle racks or automated three-dimensional warehouses and the like. The high rack is the most commonly used in the warehouses, which has a good picking efficiency and can realize quick pickup and storage of goods.

Picking means a process by which a worker of a warehouse distribution center picks up goods from a storage rack or a stack according to the name, specification, model, and quantity of the goods required in the order, and moves the goods to a tally area.

In the present disclosure, a container transporting method and device based on dense storage, a computing device, and a computer-readable storage medium are provided, which are described in detail in the following embodiments.

FIG. 1 is a structural block diagram of a computing device 100 according to an embodiment of the present disclosure. The components of the computing device 100 include but are not limited to a memory 110 and a processor 120. The processor 120 and the memory 110 are connected to each other through a bus 130, and the database 150 is used to store data.

The computing device 100 further includes an access device 140, which enables the computing device 100 to communicate via one or more networks 160. Examples of these networks include a public switched telephone network (PSTN), a local area network (LAN), a wide area network (WAN), a personal area network (PAN), or a combination of communication networks such as the Internet. The access device 140 may include one or more of any type of wired or wireless network interfaces (for example, a network interface card (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, and a near field communication (NFC) interface.

In an embodiment of the present disclosure, the above components of the computing device 100 may also be connected to other components not shown in FIG. 1, for example, via a bus. It is to be understood that the structural block diagram of the computing device shown in FIG. 1 is only for the purpose of example, and is not intended to limit the scope of the present disclosure. Those skilled in the art may add or replace other components as needed.

The computing device 100 may be any type of stationary or mobile computing device, including a mobile computer or a mobile computing device (for example, a tablet computer, a personal digital assistant, a laptop computer, a notebook computer, and a netbook), a mobile phone (for example, a smart phone), a wearable computing device (for example, a smart watch, smart glasses) or other types of mobile devices, or a stationary computing device such as a desktop computer or a PC. The computing device 100 may also be a mobile or stationary server.

It should be noted that the robot in the embodiments of the present disclosure may be controlled by a server in a warehousing system or a server in the cloud, or the robot itself may be equipped with a control chip, which is not limited in the present disclosure. In addition, actions performed by the robot in the embodiments of the present disclosure may be performed partly based on the control of the server, and partly performed based on the control instructions of its own control chip, which is not limited in the present disclosure.

The robot in the embodiment of the present disclosure is an autonomous mobile robot (AMR).

Figure 2:
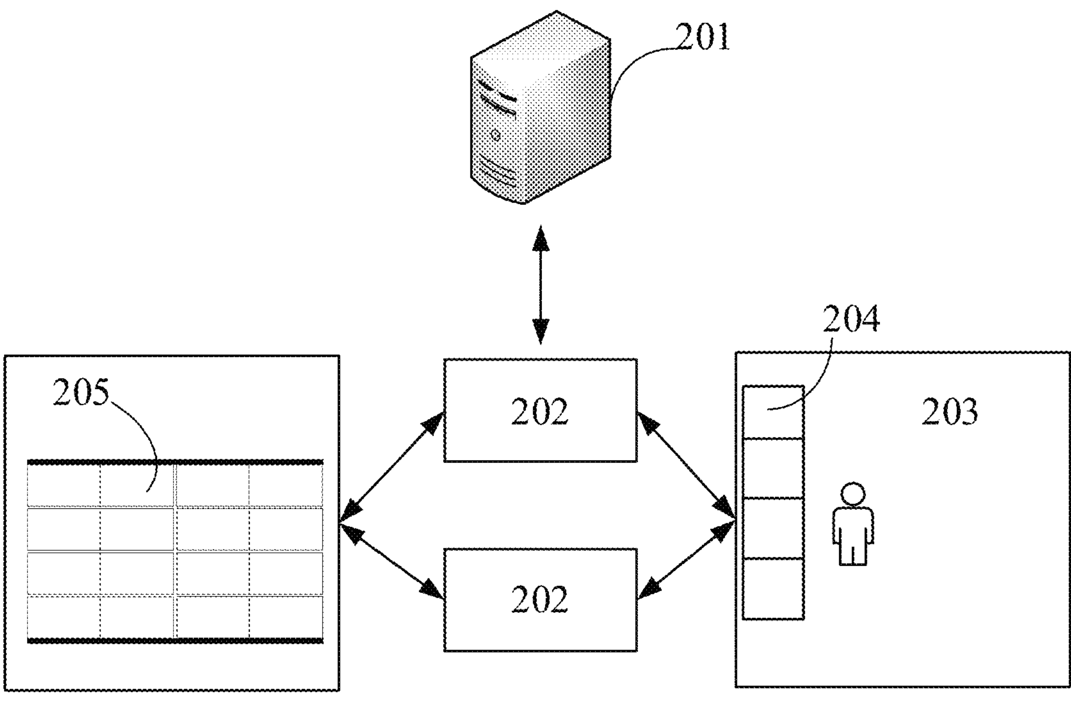
FIG. 2 is a schematic structural diagram of a warehousing system according to an embodiment of the present disclosure.

FIG. 2 is a schematic structural diagram of a warehousing system according to an embodiment of the present disclosure. As shown in FIG. 2, the system includes a control server 201, a robot 202, a workstation 203, and a storage rack 205. The storage rack 205 includes at least four columns of racks, each of which is preferably a high rack.

The high rack may have a height of 5 meters, and includes 10 floors. The storage racks 205 includes internal racks and external racks that are arranged in a dense arrangement. A container stored on the internal rack is called an internal container and a container stored on the external rack is called an external container. The robot 202 performs storage and picking of a designated container to a designated position according to the scheduling of the control server 201. A container pickup mechanism of the robot 202 is capable of storing and picking-up a container on the internal rack, that is, the container pickup mechanism of the robot 202 meets the depth requirement of dense storage. After picking-up the target container from the storage rack 205, the robot 202 can transport the target container to the workstation 203. Multiple operating stations 204 are provided in the workstation 203, so that workers can perform operations such as picking, counting, tallying or putting on the goods in the target container. The control server 201 is used to store inventory information and a correspondence between a position of a container and an identity (number) of the container, and the control server 201 can generate a container transporting task according to a required work document, assign the container transporting task to the robot 202 to perform the container transporting task, and plan a path for the robot 202 to avoid collisions. The control server 201 communicates with the robot 202, so as to obtain information such as an operation state, a position, and an identity of the robot 202 in real time.

Figure 3:
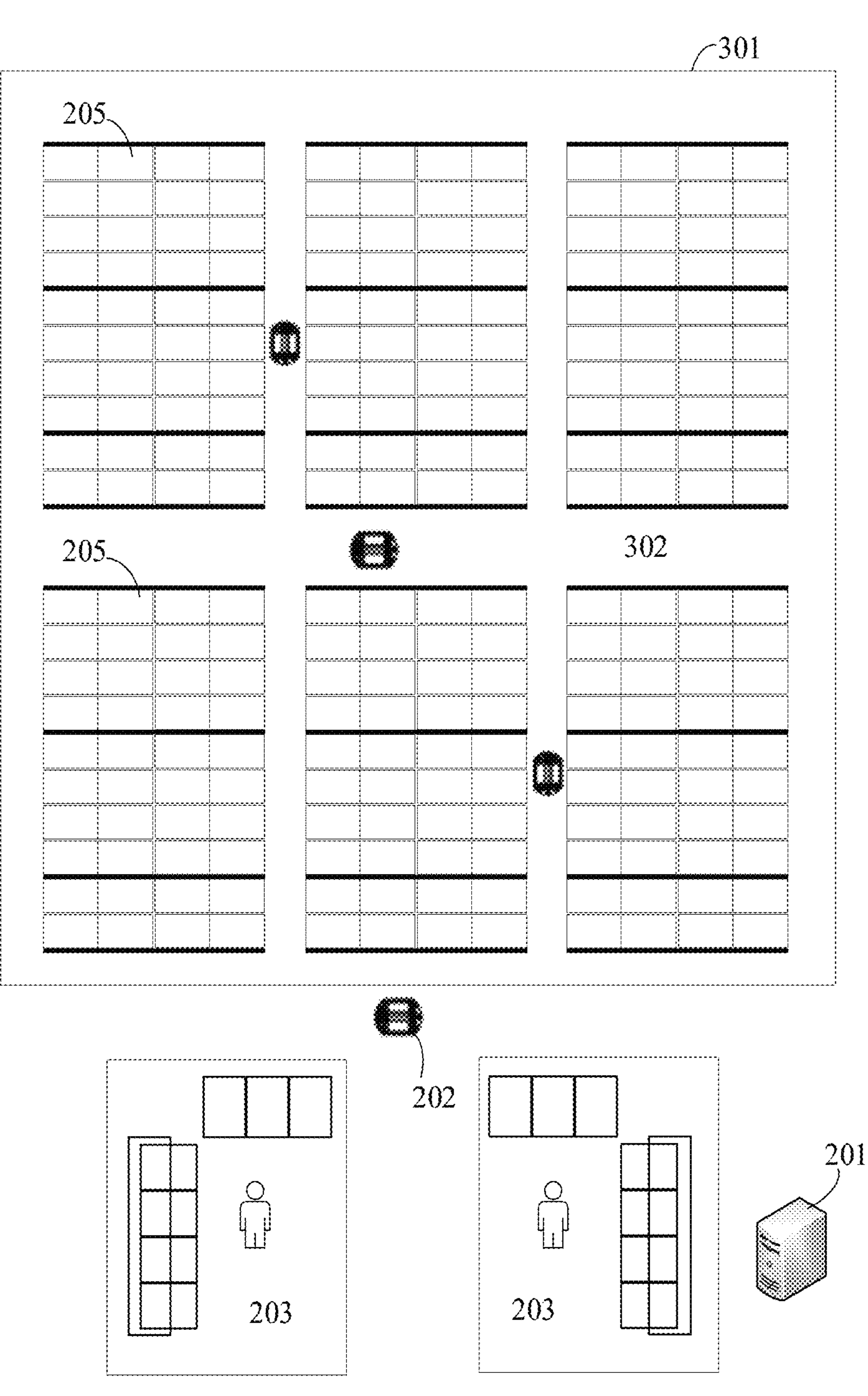
FIG. 3 is a schematic diagram of a layout of a storage area and transportation in the storage area according to an embodiment of the present disclosure.

FIG. 3 is a schematic diagram of a layout of a storage area and transportation in the storage area according to an embodiment of the present disclosure. As shown in FIG. 3, the storage area includes a rack area 301, a robot 202, a control server 201, and a workstation 203. Multiple storage racks 205 are provided in the storage area 301, and a robot passage 302 is provided between adjacent storage racks 205 for the movement of the robot 202, and the robot 202 may perform a logical operation of pickup and storage of containers under the control of the control server 201, and a transportation operation of moving containers back and forth between the rack area 301 and the workstation 203.

Figure 4:
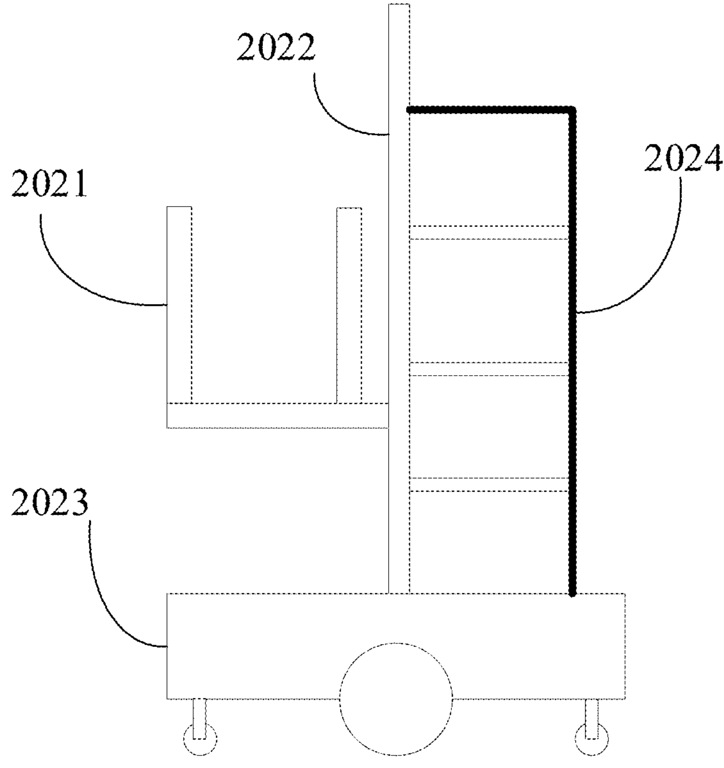
FIG. 4 is a schematic diagram of an overall structure of a robot according to an embodiment of the present disclosure.

In an embodiment of the present disclosure, as shown in FIG. 4, the robot 202 may have a cache mechanism. The robot 202 includes: a container pickup mechanism 2021, a lifting mechanism 2022, a robot motion chassis 2023, and a cache mechanism 2024. The container pickup mechanism 2021 is configured to pick up one or more target containers in an embracing manner. The lifting mechanism 2022 is configured to adjust the container pickup mechanism 2021 up and down, so that the container pickup mechanism 2021 can pick up a target container from a storage rack of any height. The robot motion chassis 2023 is configured to control the robot to travel on the robot passage along a travel route planned by the control server. The cache mechanism 2024 is configured to temporarily store at least one container and arrange the containers sequentially.

Figure 5:
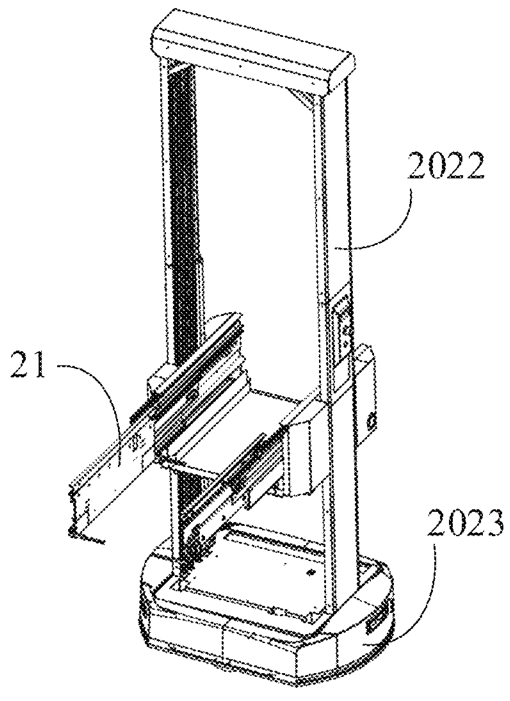
FIG. 5 is a schematic diagram of an overall structure of a robot according to another embodiment of the present disclosure.

In the embodiment of the present disclosure, as shown in FIG. 5, the robot 202 may have no cache mechanism. The robot 202 includes: a container pickup mechanism 2021, a lifting mechanism 2022, and a robot motion chassis 2023. The container pickup mechanism 2021 is configured to pick up one or more target containers. The lifting mechanism 2022 is configured to adjust the container pickup mechanism 2021 up and down, so that the container pickup mechanism 2021 can pick up a target container from a storage rack of any height. The robot motion chassis 2023 is configured to control the robot to travel on the robot passage along a travel route planned by the control server.

Figure 6:
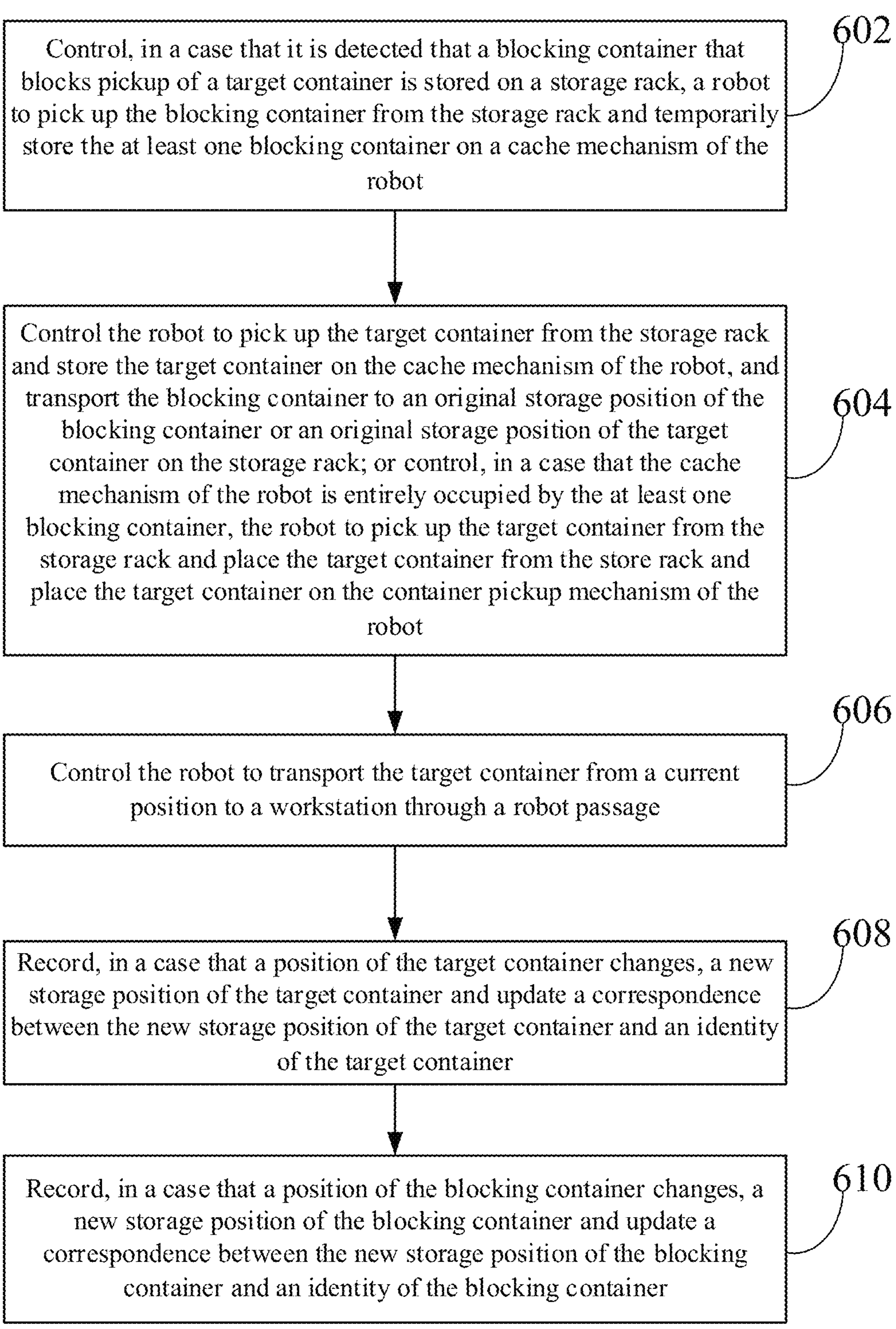
FIG. 6 is a flowchart of a container transporting method based on dense storage according to an embodiment of the present disclosure.

The processor 120 may perform steps of a method shown in FIG. 6. FIG. 6 is a schematic flow chart showing a container transporting method based on dense storage according to an embodiment of the present disclosure, which may be applied by a robot to pick up a target container from a storage rack in a case that storage racks are densely arranged. The method includes the following step 602 to step 610.

In step 602, in a case that at least one blocking container that blocks pickup of the target container is stored on the storage rack, the container pickup mechanism of the robot picks up the at least one blocking container from the storage rack and temporarily stores the at least one blocking container on the cache mechanism of the robot, the target container is one of at least one container to be picked up.

In the embodiment of the present disclosure, in a case that the robot has a container cache capability, that is, has a cache mechanism, the robot drives to a storage rack where the target container is located according to a assigned container transporting task, and determines whether there is a blocking container that blocks the pickup of the target container based on a prestored correspondence between a position of the container and an identity of the container, or image data uploaded by the robot through a camera. If there is a blocking container that blocks the pickup of the target container, the robot picks up the blocking container from the storage rack and temporarily stores the blocking container on the cache mechanism of the robot. For example, if the target container is an internal container stored on an internal rack of the storage rack, the target container will be blocked by an external container stored on an external rack of the storage rack, the robot cannot pick up the target container, the external container is a "blocking container", and the robot picks up the blocking container on the external rack of the storage rack by its container pickup mechanism and temporarily stores the blocking container on the cache mechanism of the robot, so that the target container stored on the internal rack can be picked up.

In addition, when no blocking container that blocks the pickup of the target container is stored on the storage rack, the robot directly picks up the target container from the storage rack and stores the target container on the cache mechanism of the robot, for example, in a case that the target container is an external container stored on the external rack of the storage rack, or in a case that the target container is an internal container and the storage position of the external container is empty, the robot may directly pick up the target container.

In step 604, the robot picks up the target container from the storage rack and stores the target container on the cache mechanism of the robot, and transports the blocking container to the storage rack at an original storage position of the blocking container or an original storage position of the target container. Alternatively, in a case that the cache mechanism of the robot is entirely occupied by the received blocking container, the robot picks up the target container from the storage rack and keeps the target container on the container pickup mechanism of the robot.

In the embodiment of the present disclosure, the robot picks up the target container stored on the internal rack of the storage rack from the storage rack and stores the target container on the cache mechanism of the robot, and then the robot places the previously picked up blocking container to the original storage position of the blocking container or the original storage position of the target container, thereby completing the pickup of the target container.

In the embodiment of the present disclosure, in a case that a container from another storage rack is prestored on the cache mechanism of the robot, there may be a case that the cache mechanism of the robot is entirely occupied by the blocking container and is no longer to store any container when the robot is to receive a blocking container in a current container transporting task. In this case, the robot picks up the target container from the storage rack and keeps the target container on the container pickup mechanism of the robot. For example, in a case that the cache mechanism of the robot may accommodate 4 containers, the cache mechanism of the robot being entirely occupied means that three containers picked up in other container transporting tasks and the blocking container picked up in the current container transporting task are stored, and the target container in this container transporting task is placed on the container pickup mechanism of the robot.

In step 606, the robot is controlled to transport the target container from a current position to a workstation through a robot passage.

In the embodiment of the present disclosure, the robot of the present disclosure transports the target container from the current position to the workstation through the robot passage, so that an operator on the operation station in the workstation can obtain the target container. In the case that the cache mechanism is entirely occupied by the received blocking container, the blocking container and the target container are both transported from the current position to the workstation through the robot passage, that is, the robot directly transports all of the picked-up containers to the operation station. Since the blocking container has not been ordered, the blocking container is skipped when picking goods.

In step 608, in a case that a position of the target container changes, a storage position of the target container is recorded and a correspondence between the storage position of the target container and an identity of the target container is updated.

In step 610, in a case that a position of the blocking container changes, a storage position of the blocking container is recorded, and a correspondence between the storage position of the blocking container and an identity of the blocking container is updated.

In the embodiment of the present disclosure, in a case that a storage position of any container changes, key data, such as operation data, will be recorded immediately, so that the new position of the container after being moved is calculated and a correspondence between the storage position of the container and the identity of the container is updated.

In the present disclosure, a densely stored storage rack is adopted. When picking-up containers, a robot with a cache mechanism picks up the blocking container and places the blocking container on the cache mechanism, then places the target container on the cache mechanism, and finally returns the blocking container back to the original position or the position of the target container, thereby realizing the function of picking-up the target container of dense storage, thus achieving a stable and reliable application process.

According to the present disclosure, at least four columns of storage racks are arranged, to form a warehousing logistics manner with dense storage of containers, such that the number of effective containers and the size of effective storage space are greatly increased, thereby improving the storage density and storage capacity of a size-fixed storage space, thus reducing the cost of warehousing and logistics. Accordingly, a container transporting method is further provided according to the present disclosure, which is applicable for transporting containers and removing obstacles under intense storage, multiple container pickup logics and container return logics are adopted, such that the reliability of the warehousing system based on intense storage can be ensured, thereby improving the efficiency of logistics transportation and reducing logistics costs.

Figure 7:
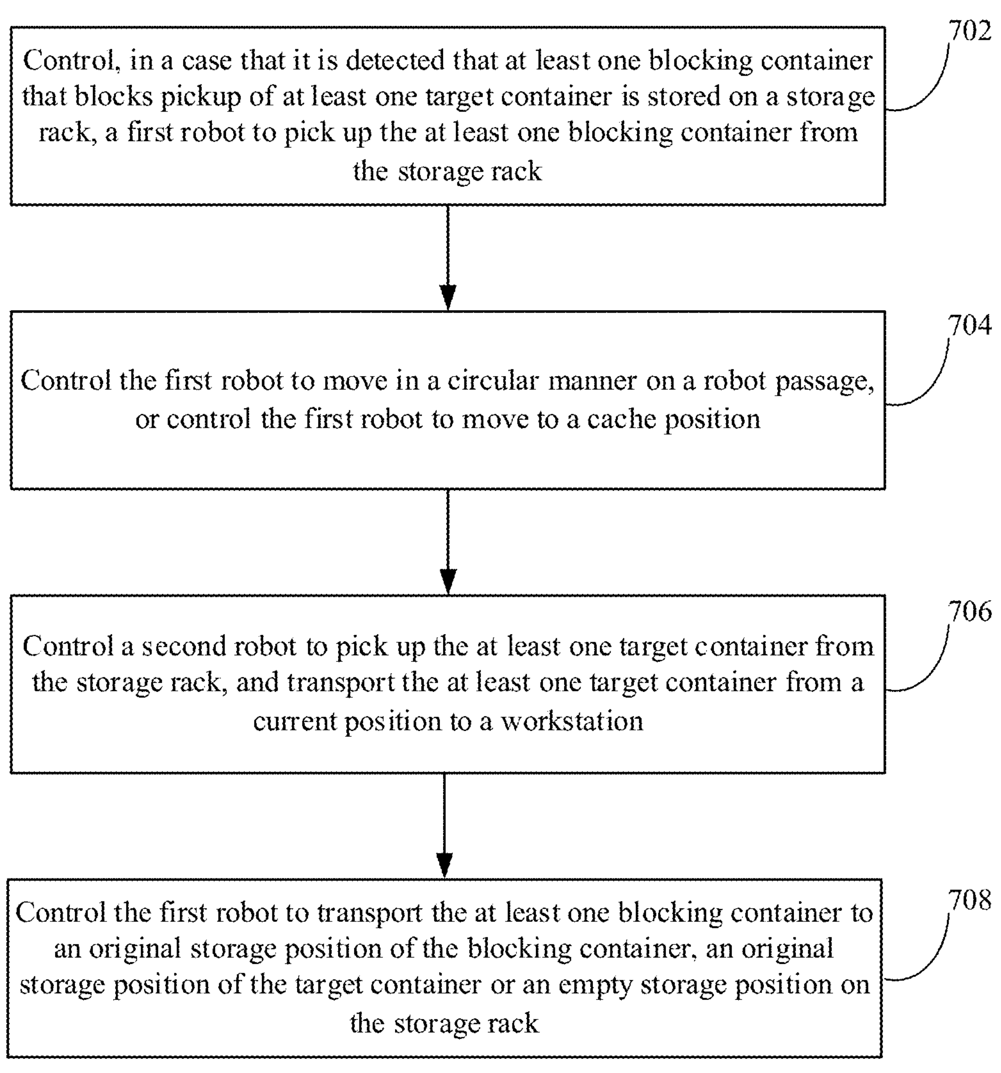
FIG. 7 is a flowchart of a container transporting method based on dense storage according to another embodiment of the present disclosure.

The processor 120 may perform steps of a method shown in FIG. 7. FIG. 7 is a schematic flow chart showing a container transporting method based on dense storage according to an embodiment of the present disclosure, which may be applied by a robot to pick up a target container on a storage rack in a case that storage racks are densely arranged. The method includes the following step 702 to step 708.

In step 702, in a case that at least one blocking container that blocks pickup of at least one target container is stored on a storage rack, the first robot picks up the at least one blocking container from the storage rack.

In the embodiment of the present disclosure, the first robot in the robots drives to a storage rack where the target container is located according to a container transporting task, and determines whether there is at least one blocking container that blocks the pickup of the at least one target container based on a prestored correspondence between a position of the container and an identity of the container, or image data uploaded by the first robot through a camera. If there is at least one blocking container that blocks the pickup of the at least one target container, the first robot picks up the at least one blocking container from the storage rack. For example, if the target container is an internal container stored on an internal rack of the storage rack, the target container will be blocked by an external container stored on an external rack of the storage rack, the robot cannot pick up the target container, the external container is a "blocking container", and the first robot picks up the at least one blocking container from the storage rack by its container pickup mechanism, so as to pick up the at least one target container stored on the internal rack of the storage rack.

In step 704, the first robot moves in the robot passage.

In the embodiment of the present disclosure, after picking-up the at least one blocking container, the first robot may move in the robot passage of the storage area, for example, the first robot may move in a circle in the passage, or move to the cache position, the cache position is a position that does not prevent other robots from picking-up other containers, for example, positions on other passages than the two storage racks, or the cache position is a nearby area of the target container or a remote area of the target container, as long as the cache position does not block a movement route of another robot, so as to wait for a second robot of the at least one robot to pick up or return the at least one target container.

In step 706, the second robot picks up the at least one target container from the storage rack, and transports the at least one target container from a current position to a workstation.

In the embodiment of the present disclosure, the second robot in the at least one robot of the present disclosure picks up the at least one target container from the storage rack, and transports the at least one target container from the current position to the workstation, so that an operator on the operation station in the workstation can obtain the target container.

In step 708, the first robot transports the at least one blocking container to the storage rack at the original storage position of the blocking container, the original storage position of the target container or another empty storage position.

In the embodiment of the present disclosure, after the second robot picks up the at least one blocked target container, the first robot of the present disclosure transports the at least one blocking container to the storage rack at the original storage position of the blocking container, the original storage position of the target container or an empty storage position. That is, the first robot carrying the external container may return the external container to the original position, the storage position of the internal container that has been picked up or a nearby empty storage position.

In the embodiment of the present disclosure, the first robot picking-up the at least one blocking container from the storage rack includes:

- sequentially picking-up, in a case that the first robot has a cache mechanism, the at least one blocking container from the storage rack by the container pickup mechanism of the at least one first robot, and sequentially storing the at least one blocking container on the cache mechanism of the at least one first robot until the cache mechanism of the at least one first robot is entirely occupied;
- picking-up, in a case that the first robot does not have a cache mechanism, one of the at least one blocking container from the storage rack by the container pickup mechanism of the at least one first robot and keeping the blocking container on the container pickup mechanism.

In the above embodiment, there are different cases according to whether the first robot has a cache mechanism. In a case that the first robot has a cache mechanism, the first robot may pick up multiple blocking containers, that is, multiple external containers, and stores the multiple blocking containers on the cache mechanism of the first robot until the cache mechanism of the first robot is entirely occupied. In a case that the first robot does not have a cache mechanism, the first robot may only pick up one blocking container, that is, one external container, and place the one blocking container on the container pickup mechanism of the first robot.

In an embodiment of the present disclosure, the second robot picking-up the at least one target container from the storage rack includes:

- sequentially picking-up, in a case that the second robot has a cache mechanism, the at least one target container from the storage rack by the container pickup mechanism of the second robot and sequentially storing the target container on the cache mechanism of the second robot until the cache mechanism of the second robot is entirely occupied; and
- picking-up, in a case that the second robot does not have a cache mechanism, one of the at least one target container from the storage rack by the container pickup mechanism of the second robot and keeping the target container on the container pickup mechanism of the second robot.

In the above embodiment, there are different cases according to whether the second robot has a cache mechanism. In a case that the second robot has a cache mechanism, the second robot may pick up multiple target containers, that is, multiple internal containers, and sequentially stores the multiple target containers on the cache mechanism of the second robot until the cache mechanism of the second robot is entirely occupied. In a case that the second robot does not have a cache mechanism, the second robot may only pick up one target container, that is, one internal container, and place the one target container on the container pickup mechanism of the second robot.

In an embodiment of the present disclosure, the method further includes:

- recording, in a case that a position of the target container changes, a new storage position of the target container and updating a correspondence between the new storage position of the target container and an identity of the target container; and
- recording, in a case that a position of the blocking container changes, a new storage position of the blocking container and updating a correspondence between the new storage position of the blocking container and an identity of the blocking container.

In the above embodiment, in a case that a storage position of any container changes, key data, such as operation data, will be recorded immediately, so that the new position of the container after being moved is calculated and a correspondence between the storage position of the container and the identity of the container is updated.

In an embodiment of the present disclosure, the method further includes:

- picking-up, in a case that at least one blocking container that blocks pickup of the at least one target container is not stored on the storage rack, the at least one target container from the storage rack by the first robot.

In the above embodiment, if there is no at least one blocking container that blocks the pickup of at least one target container, for example, the target container is an external container stored on an external rack of the storage rack, or the target container is an internal container and the storage position of the external container is empty, the number of target containers that can be directly picked up is determined according to the cache capability of the first robot.

In the present disclosure, a densely stored storage rack is adopted, and two robots cooperate with each other to pick up containers. The first robot picks up one or more blocking containers, the second robot picks up one or more target containers, and finally the blocking container is returned back to the original position or the position of the target container, thereby realizing the function of picking-up a target container of dense storage and meeting a variety of application occasions with different hardware configurations, thus achieving a stable and reliable application process.

Figure 8:
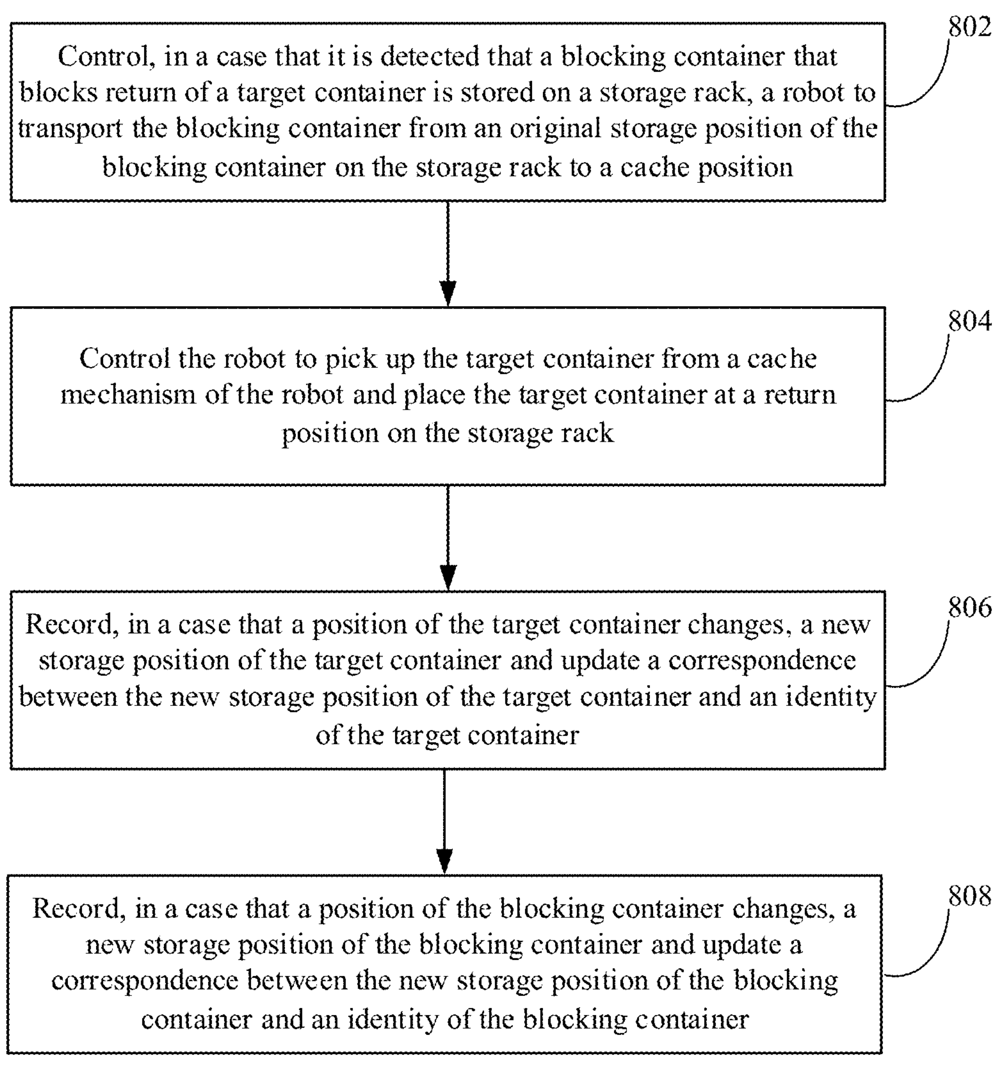
FIG. 8 is a flowchart of a container transporting method based on dense storage according to another embodiment of the present disclosure.

The processor 120 may perform steps of a method shown in FIG. 8. FIG. 8 is a schematic flow chart showing a container transporting method based on dense storage according to an embodiment of the present disclosure, which may be applied by a robot to return a target container to a storage rack in a case that storage racks are densely arranged. The method includes the following step 802 to step 808.

In step 802, in a case that a blocking container that blocks return of the target container is stored on the storage rack, the robot transports the blocking container from the original storage position of the blocking container on the storage rack to a cache position.

In the embodiment of the present disclosure, in a case that the robot has a container cache capability, that is, has a cache mechanism, the robot drives to a storage rack where the target container is located according to a assigned container transporting task, and determines whether there is a blocking container that blocks the return of the target container based on a prestored correspondence between a position of the container and an identity of the container, or image data uploaded by the robot through a camera. If there is a blocking container that blocks the return of the target container, the robot transports the blocking container from an original position of the blocking container on the storage rack to a cache position. For example, if the target container is an internal container stored on an internal rack of the storage rack, the target container will be blocked by an external container stored on an external rack of the storage rack, the robot cannot return the target container, the external container is a "blocking container", and the robot transports the blocking container on the external rack of the storage rack by its container pickup mechanism from the storage position of the blocking container to the cache position, so that there is a return position on the storage rack without any blocking to which the target container can be directly returned.

In step 804, the robot picks up the target container from the cache mechanism of the robot and places the target container at the return position on the storage rack.

In the embodiment of the present disclosure, after the blocking container is picked up, the robot of the present disclosure picks up the target container carried by the robot from the cache mechanism of the robot, and places the target container at the return position on the storage rack by the container pickup mechanism, thereby achieving the return of the target container.

In step 806, in a case that a position of the target container changes, a storage position of the target container is recorded, and a correspondence between the storage position of the target container and an identity of the target container is updated.

In step 808, in a case that a position of the blocking container changes, a storage position of the blocking container is recorded, and a correspondence between the storage position of the blocking container and an identity of the blocking container is updated.

In the embodiment of the present disclosure, in a case that a storage position of any container changes, key data, such as operation data, will be recorded immediately, so that a new position of the container after being moved is calculated and a correspondence between the storage position of the container and the identity of the container is updated.

In the embodiment of the present disclosure, if there is one blocking container, an example of a container returning manner is described, which includes the following steps S12 to S14.

In step S12, in the case that a blocking container that blocks the return of the target container is stored on the storage rack, the robot places the blocking container from the original storage position of the blocking container on the storage rack to the original storage position of the target container.

In step S14, the robot picks up the target container from the cache mechanism of the robot and places the target container at the original storage position of the blocking container on the storage rack.

In the above embodiment, the robot has a cache mechanism. In a case that the target container to be returned is an internal container, the robot first pushes the external container to a position of an internal container through the container pickup mechanism, then picks up the internal container that needs to be returned from the cache mechanism and place the internal container at a position of the external container, so that the storage positions of the internal container and the external container are interchanged with each other, that is, the robot transports the blocking container from the original storage position of the blocking container on the storage rack to the original storage position of the target container, and then the robot picks up the target container from the cache mechanism of the robot and places the target container at the original storage position of the blocking container on the storage rack.

In the embodiment of the present disclosure, if there are at least two blocking containers, an example of a container returning manner is described, which includes the following steps:

- sequentially translating, by the container pickup mechanism of the robot, the at least two blocking containers from an original storage position of the blocking container on the storage rack by one storage position in a depth direction of the storage rack; and
- picking-up, by the container pickup mechanism of the robot, the target container from the cache mechanism of the robot and places the target container on an empty storage position of original storage positions of the at least two blocking containers on the storage rack.

In the above embodiment, the robot has a cache mechanism. In a case that the target container to be returned is an internal container, the robot first sequentially pushes the at least two external containers to a position of an internal container by the container pickup mechanism, then picks up the internal container that needs to be returned from the cache mechanism and place the internal container at the empty position of the external container, so that the storage positions of the internal container and the external container are interchanged with each other, that is, the robot transports one of the at least two blocking containers from the original storage positions of the blocking containers on the storage rack to the original storage position of the target container, and then the robot picks up the target container from the cache mechanism of the robot and places the target container at the empty original storage position of the blocking container on the storage rack.

In the embodiment of the present disclosure, an example of a container returning manner is described, which includes the following step S22 to step S26.

In step S22, in a case that a blocking container that blocks the return of the target container is stored on the storage rack, the robot transports the blocking container from the original storage position of the blocking container on the storage rack to the cache mechanism of the robot.

In step S24, the robot picks up the target container from the cache mechanism of the robot and places the target container at the original storage position of the target container on the storage rack.

In step S26, the robot transports the blocking container from the cache mechanism of the robot to the original storage position of the blocking container on the storage rack.

In the above embodiment, the robot has a cache mechanism. In a case that the target container to be returned is an internal container, the robot first picks up the blocking container as an external container from the storage rack by the container pickup mechanism, and temporarily places the blocking container in the cache mechanism of the robot, and then returns the target container as the internal container to the internal container position, that is, the original storage position of the target container, and finally returns the picked up blocking container to the position of the external container, that is, the original storage position of the blocking container.

In addition, in a case that no blocking container that blocks the return of the target container is stored on the storage rack, the robot of the present disclosure picks up the target container from the cache mechanism of the robot and places the target container at the return position on the storage rack. The return position is the original storage position of the blocking container or the original storage position of the target container.

In the present disclosure, a densely stored storage rack is adopted. When picking-up containers, a robot with a cache mechanism picks up the blocking container and places the blocking container on the cache mechanism, then places the target container on the cache mechanism, and finally returns the blocking container back to the original position or the position of the target container, thereby realizing the function of returning the target container of dense storage, thus achieving a stable and reliable application process.

Figure 9:
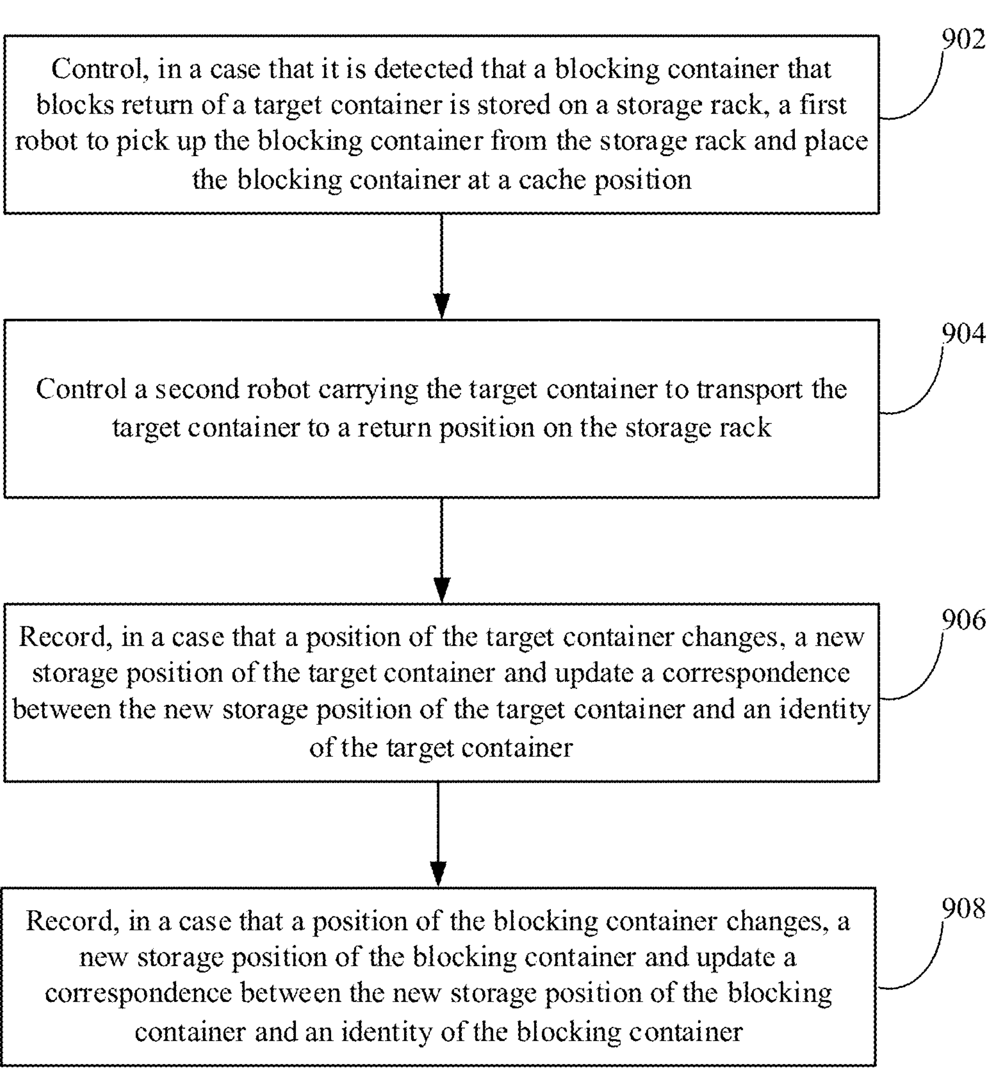
FIG. 9 is a flowchart of a container transporting method based on dense storage according to another embodiment of the present disclosure.

The processor 120 may perform steps of a method shown in FIG. 9. FIG. 9 is a schematic flow chart showing a container transporting method based on dense storage according to an embodiment of the present disclosure, which may be applied by a robot to return a target container to a storage rack in a case that storage racks are densely arranged. The method includes the following step 902 to step 908.

In step 902, in a case that a blocking container that blocks return of a target container is stored on a storage rack, a first robot picks up the blocking container from the storage rack and places the blocking container at a cache position.

In the embodiment of the present disclosure, in a case that the robot does not have a container cache capability, that is, does not have a cache mechanism, the first robot of the robot drives to a storage rack where the target container is located according to a container transporting task, and determines whether there is a blocking container that blocks the return of the target container based on a prestored correspondence between a position of the container and an identity of the container, or image data uploaded by the first robot through a camera. If there is a blocking container that blocks the return of the target container, the first robot transports the blocking container from an original position of the blocking container on the storage rack to a cache position. For example, if the target container is an internal container stored on an internal rack of the storage rack, the target container will be blocked by an external container stored on an external rack of the storage rack, the first robot cannot return the target container, the external container is a "blocking container", and the first robot transports the blocking container on the external rack of the storage rack by its container pickup mechanism to the cache position, so that there is a return position on the storage rack without any blocking to which the target container can be directly returned.

In step 904, the second robot carrying the target container transports the target container to the return position on the storage rack.

In the embodiment of the present disclosure, after the blocking container is picked up, the second robot in the robots of the present disclosure places the carried target container at the return position on the storage rack by the container pickup mechanism of the second robot, thereby achieving the return of the target container.

In step 906, in a case that a position of the target container changes, a storage position of the target container is recorded, and a correspondence between the storage position of the target container and an identity of the target container is updated.

In step 908, in a case that a position of the blocking container changes, a storage position of the blocking container is recorded, and a correspondence between the storage position of the blocking container and an identity of the blocking container is updated.

In the embodiment of the present disclosure, in a case that a storage position of any container changes, key data, such as operation data, will be recorded immediately, so that a new position of the container after being moved is calculated and a correspondence between the storage position of the container and the identity of the container is updated.

In the embodiment of the present disclosure, there is one blocking container, an example of a container returning manner is described, which includes the following steps S32 to S34.

In step S32, in a case that a blocking container that blocks the return of the target container is stored on the storage rack, the container pickup mechanism of the first robot transports the blocking container from the original storage position of the blocking container on the storage rack to the original storage position of the target container.

In a step S34, the container pickup mechanism of the second robot transports the target container to the original storage position of the blocking container on the storage rack.

In the embodiment of the present disclosure, the robot does not have a cache mechanism. In a case that the target container to be returned is an internal container, the first robot in the robots first pushes the blocking container as the external container by the container pickup mechanism from a position of an external container to a position of an internal container on the storage rack, that is, transports the blocking container from the original storage position of the blocking container on the storage rack to the original storage position of the target container, then the container pickup mechanism of the second robot returns the target container as the internal container to the position of the external container, that is, the original storage position of the blocking container, so that the storage position of the target container and the position of the blocking container are interchanged with each other.

In the embodiment of the present disclosure, there are at least two blocking containers, an example of a container returning manner is described, which includes the following steps:

- sequentially translating, by the container pickup mechanism of the first robot, the at least two blocking containers from an original storage position of the blocking container on the storage rack by one storage position in a depth direction of the storage rack;
- picking-up, in a case that the second robot has a cache mechanism, the target container from the cache mechanism of the second robot by the container pickup mechanism of the second robot, and placing the target container at the original storage position of one of the at least two blocking containers on the storage rack; and
- directly placing, in a case that the second robot does not have a cache mechanism and the target container is located in the container pickup mechanism of the second robot, the target container on an empty storage position of the original storage positions of the at least two blocking containers on the storage rack by the container pickup mechanism of the second robot.

In the embodiment of the present disclosure, the robot does not have a cache mechanism. In a case that the target container to be returned is an internal container, the first robot in the robots first sequentially pushes the at least two blocking containers as external containers by the container pickup mechanism from a position of the external container to a position of an internal container on the storage rack, that is, transports the blocking container from the original storage position of the blocking container on the storage rack to an original storage position of the target container, then the second robot returns the target container as the internal container by the container pickup mechanism to the position of the external container, that is, the original storage position of the blocking container, so that the storage position of the target container and the position of the blocking container are interchanged with each other.

In the embodiment of the present disclosure, an example of a container returning manner is described, which includes the following step S42 to step S46.

In step S42, the container pickup mechanism of the first robot picks up the blocking container from the storage rack and places the blocking container on the container pickup mechanism of the first robot.

In step S44, the container pickup mechanism of the second robot transports the target container to the original storage position of the target container on the storage rack.

In step S46, the container pickup mechanism of the first robot transports the blocking container to the original storage position of the blocking container on the storage rack or an empty storage position.

In the embodiment of the present disclosure, the robot does not have a cache mechanism. In a case that the target container to be returned is an internal container, the first robot in the robots first picks up the blocking container as the external container by the container pickup mechanism from the storage rack, the container pickup mechanism of the second robot transports the target container to a position of an internal container on the storage rack, that is, the original storage position of the target container, finally the first robot returns the blocking container by the container pickup mechanism to the position of the external container or a nearby empty storage position.

In addition, in a case that no blocking container that blocks the return of the target container is stored on the storage rack, the second robot of the present disclosure directly transports the target container to the return position on the storage rack, the return position is the original storage position of the blocking container or the original storage position of the target container.

In the present disclosure, a densely stored storage rack is adopted. When returning containers, the two robot cooperate with each other, where a first robot picks up or moves the blocking container, the second robot stores the target container, and finally the blocking container is returned to the original position or a position of the target container, thereby realizing the function of returning the target container of dense storage and meeting a variety of application occasions with different hardware configurations, thus achieving a stable and reliable application process.

Corresponding to the above method embodiments, a container transporting device based on dense storage is further provided according to an embodiment of the present disclosure. FIG. 10 is a schematic structural diagram of a container transporting device based on dense storage according to an embodiment of the present disclosure. As shown in FIG. 10, the device includes a first transporting module 1001, and a second transporting module 1002. The first transporting module 1001 is configured to control, in a case that it is detected that a blocking container that blocks pickup of a target container is stored on a storage rack, a robot to pick up the blocking container from the storage rack and temporarily store the blocking container on a cache mechanism of the robot. The second transporting module 1002 is configured to control the robot to pick up the target container from the storage rack and store the target container on the cache mechanism of the robot, and transport the blocking container to an original storage position of the blocking container or an original storage position of the target container on the storage rack; or control, in a case that the cache mechanism of the robot is entirely occupied by the picked up blocking container, the robot to pick up the target container from the storage rack and keep on the target container on the container pickup mechanism of the robot.

In an embodiment, the device further includes a delivery module. The delivery module is configured to control the robot to transport the target container from a current position to a workstation through a robot passage. In the case that the cache mechanism is entirely occupied by the picked-up blocking container, the blocking container and the target container are both transported from the current position to the workstation through the robot passage.

In an embodiment, the device further includes a first position updating module and a second position updating module. The first position updating module is configured to record, in a case that a position of the target container changes, a storage position of the target container and update a correspondence between the storage position of the target container and an identity of the target container. The second position updating module is configured to record, in a case that a position of the blocking container changes, a storage position of the blocking container and update a correspondence between the storage position of the blocking container and an identity of the blocking container.

Corresponding to the above method embodiments, a container transporting device based on dense storage is further provided according to an embodiment of the present disclosure. FIG. 11 is a schematic structural diagram of a container transporting device based on dense storage according to an embodiment of the present disclosure. As shown in FIG. 11, the device includes a third transporting module 1101, a moving module 1102, a fourth transporting module 1103, and fifth transporting module 1104. The third transporting module 1101 is configured to control, in a case that it is detected that at least one blocking container that blocks pickup of at least one target container is stored on a storage rack, a first robot to pick up the at least one blocking container from the storage rack. The moving module 1102 is configured to control the first robot to move in a circular way on the robot passage, or to control the first robot to move to a cache position. The cache position is at a nearby area that does not affect the pickup of the target container. The fourth transporting module 1103 is configured to control a second robot to pick up the at least one target container from the storage rack, and transport the at least one target container from a current position to a workstation. The fifth transporting module 1104 is configured to control the first robot to transport the at least one blocking container to an original storage position of the blocking container, an original storage position of the target container or an empty storage position on the storage rack.

In an embodiment, the third transporting module includes a third transporting subunit. The third transporting subunit is configured to control, in a case that the first robot has a cache mechanism, a container pickup mechanism of the first robot to pick the at least one blocking container from the storage rack, and sequentially store the at least one blocking container on the cache mechanism of the first robot until the cache mechanism of the first robot is entirely occupied. The third transporting subunit is further configured to control, in a case that the first robot does not have a cache mechanism, the container pickup mechanism of the first robot to pick up any one of the at least one container from the storage rack and place the blocking container on the container pickup mechanism of the first robot.

In an embodiment, the fourth transporting module includes a fourth transporting subunit. The fourth transporting subunit is configured to control, in a case that the second robot has a cache mechanism, the container pickup mechanism of the second robot to pick up the at least one target container from the storage rack, and store the at least one target container on the cache mechanism of the second robot until the cache mechanism of the second robot is entirely occupied. The fourth transporting subunit is further configured to control, in a case that the second robot does not have a cache mechanism, the container pickup mechanism of the second robot to pick up any one of the at least one target container from the storage rack and place the target container on the container pickup mechanism of the second robot.

In an embodiment, the device further includes a third position updating module, and a fourth position updating module. The third position updating module is configured to record, in a case that a position of the target container changes, a storage position of the target container and update a correspondence between the storage position of the target container and an identity of the target container. The fourth position updating module is configured to record, in a case that a position of the blocking container changes, a storage position of the blocking container and update a correspondence between the storage position of the blocking container and an identity of the blocking container.

Figure 12:
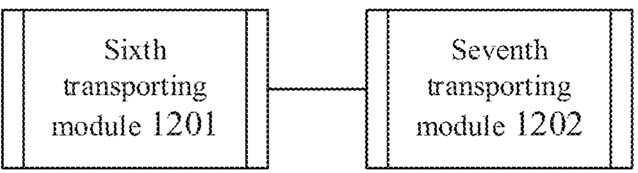
FIG. 12 is a schematic structural diagram of a container transporting device based on dense storage according to an embodiment of the present disclosure.

Corresponding to the above method embodiments, a container transporting device based on dense storage is further provided according to an embodiment of the present disclosure. FIG. 12 shows a schematic structural diagram of a container transporting device based on dense storage according to an embodiment of the present disclosure. As shown in FIG. 12, the device includes a sixth transporting module 1201 and a seventh transporting module 1202. The sixth transporting module 1201 is configured to control, in a case that it is detected that a blocking container that blocks return of a target container is stored on a storage rack, a robot to transport the blocking container from an original storage position of the blocking container on the storage rack to a cache position. The seventh transporting module 1202 is configured to control the robot to pick up the target container from a cache mechanism of the robot and place the target container at a return position on the storage rack.

In an embodiment, the sixth transporting module includes a sixth transporting subunit. The sixth transporting subunit is configured to control the robot to transport the blocking container from the original storage position of the blocking container on the storage rack to the original storage position of the target container. The seventh transporting module includes a seventh transporting subunit. The seventh transporting subunit is configured to control the robot to pick up the target container from the cache mechanism of the robot and place the target container at the original storage position of the blocking container on the storage rack.

In an embodiment, the sixth transporting module includes a sixth transporting subunit. The sixth transporting subunit is configured to control the robot to transport the blocking container from the original storage position of the blocking container on the storage rack to the cache mechanism of the robot. The seventh transporting module includes a seventh transporting subunit. The seventh transporting subunit is configured to control the robot to pick up the target container from the cache mechanism of the robot and place the target container at the original storage position of the target container on the storage rack.

In an embodiment, the device further includes an eighth transporting module. The eighth transporting module is configured to control the robot to transport the blocking container from the cache mechanism of the robot to the original storage position of the blocking container on the storage rack.

In an embodiment, the device further includes a fifth position updating module and a sixth position updating module. The fifth position updating module is configured to record, in a case that a position of the target container changes, a storage position of the target container and update a correspondence between the storage position of the target container and an identity of the target container. The sixth position updating module is configured to record, in a case that a position of the blocking container changes, a storage position of the blocking container and update a correspondence between the storage position of the blocking container and an identity of the blocking container.

Figure 13:
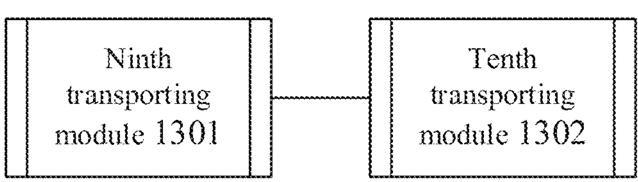
FIG. 13 is a schematic structural diagram of a container transporting device based on dense storage according to an embodiment of the present disclosure.

Corresponding to the above method embodiments, a container transporting device based on dense storage is further provided according to an embodiment of the present disclosure. FIG. 13 is a schematic structural diagram of a container transporting device based on dense storage according to an embodiment of the present disclosure. As shown in FIG. 13, the device includes a ninth transporting module 1301 and a tenth transporting module 1302. The ninth transporting module 1301 is configured to control, in a case that it is detected that a blocking container that blocks the return of the target container is stored on the storage rack, the first robot to pick up the blocking container from the storage rack and transport the blocking container to a cache position. The tenth transporting module 1302 is configured to control a second robot carrying the target container to transport the target container to a return position on the storage rack.

In an embodiment, the ninth transporting module includes a ninth transporting subunit. The ninth transporting subunit is configured to control the container pickup mechanism of the first robot to transport the blocking container from the original storage position of the blocking container on the storage rack to the original storage position of the target container. The tenth transporting module includes a tenth transporting subunit. The tenth transporting subunit is configured to control the container pickup mechanism of the second robot to transport the target container to the original storage position of the blocking container on the storage rack.

In an embodiment, the ninth transporting module includes a ninth transporting subunit. The ninth transporting subunit is configured to control the container pickup mechanism of the first robot to pick up the blocking container from the storage rack and place the blocking container on the container pickup mechanism of the first robot. The tenth transporting module includes a tenth transporting subunit. The tenth transporting subunit is configured to control the container pickup mechanism of the second robot to transport the target container to the original storage position of the target container on the storage rack.

In an embodiment, the device further includes an eleventh transporting module. The eleventh transporting module is configured to control the container pickup mechanism of the first robot to transport the blocking container to the original storage position of the blocking container or an empty storage position on the storage rack.

In an embodiment, the device further includes a seventh position updating module and an eighth position updating module. The seventh position updating module is configured to record, in a case that a position of the target container changes, a storage position of the target container and update a correspondence between the storage position of the target container and an identity of the target container. The eighth position updating module is configured to record, in a case that a position of the blocking container changes, a storage position of the blocking container and update a correspondence between the storage position of the blocking container and an identity of the blocking container.

According to the present disclosure, at least four columns of storage racks are arranged, to form a warehousing logistics manner with dense storage of containers, such that the number of effective containers and the size of effective storage space are greatly increased, thereby improving the storage density and storage capacity of a size-fixed storage space, thus reducing the cost of warehousing and logistics. Accordingly, a container transporting method is further provided according to the present disclosure, which is applicable for transporting containers and removing obstacles under intense storage, multiple container pickup logics and container return logics are adopted, such that the reliability of the warehousing system based on intense storage can be ensured, thereby improving the efficiency of logistics transportation and reducing logistics costs.

A computing device is further provided according to an embodiment of the present disclosure, which includes a memory, a processor, and computer instructions stored on the memory and can run on the processor, and the processor, when executing the instructions, performs the following steps:

- controlling, in a case that it is detected that a blocking container that blocks pickup of a target container is stored on a storage rack, a robot to pick up the blocking container from the storage rack and temporarily store the blocking container on a cache mechanism of the robot; and
- controlling the robot to pick up the target container from the storage rack and store the target container on the cache mechanism of the robot, and transport the blocking container to an original storage position of the blocking container or an original storage position of the target container on the storage rack; or controlling, in a case that the cache mechanism of the robot is entirely occupied by the picker up blocking container, the robot to pick up the target container from the storage rack and keep the target container on the container pickup mechanism of the robot.

A computing device is further provided according to an embodiment of the present disclosure, which includes a memory, a processor, and computer instructions stored on the memory and can run on the processor, and the processor, when executing the instructions, performs the following steps:

- controlling, in a case that it is detected that at least one blocking container that blocks pickup of at least one target container is stored on a storage rack, a first robot to pick up the at least one blocking container from the storage rack;
- controlling the first robot to move in a circular manner on a robot passage, or controlling the first robot to move to a cache position, where the cache position is located at a nearby area that does not affect the pickup of the target container;
- controlling a second robot to pick up the at least one target container from the storage rack, and transport the at least one target container from a current position to a workstation; and
- controlling the first robot to transport the at least one blocking container to an original storage position of the blocking container, an original storage position of the target container or an empty storage position on the storage rack.

A computing device is further provided according to an embodiment of the present disclosure, which includes a memory, a processor, and computer instructions stored on the memory and can run on the processor, and the processor, when executing the instructions, performs the following steps:

- controlling, in a case that it is detected that a blocking container that blocks return of a target container is stored on a storage rack, a robot to transport the blocking container from an original storage position of the blocking container on the storage rack to a cache position; and
- controlling the robot to pick up the target container from a cache mechanism of the robot and place the target container at a return position on the storage rack.

A computing device is further provided according to an embodiment of the present disclosure, which includes a memory, a processor, and computer instructions stored on the memory and can run on the processor, and the processor, when executing the instructions, performs the following steps:

- controlling, in a case that it is detected that a blocking container that blocks return of a target container is stored on a storage rack, a first robot to pick up the blocking container from the storage rack and place the blocking container at a cache position; and
- controlling a second robot carrying the target container to transport the target container to a return position on the storage rack.

A computer-readable storage medium is further provided according to an embodiment of the present disclosure, which includes computer instructions that, when executed by a processor, implement the steps of the above container transporting method based on dense storage.

The foregoing is a schematic solution of a computer-readable storage medium of this embodiment. It should be noted that the technical solution of the computer-readable storage medium belongs to the same concept as the above technical solution of the container transporting method based on dense storage. For the details of the technical solution of the computer-readable storage medium that are not described in detail, reference may be made to the above description of the technical solution of the container transporting method based on dense storage.

The foregoing describes specific embodiments of the present disclosure. Other embodiments are within the scope of the claims. In some cases, the actions or steps described in the claims may be performed in a different order than in the embodiments and still achieve desired results. In addition, the processes depicted in the drawings do not necessarily mean being performed in the specific order or sequential order shown to achieve the desired results. In some embodiments, multitasking and parallel processing are also possible or may be advantageous.

The computer instructions include computer program codes, and the computer program codes may be in the form of source codes, object codes, executable files, or some intermediate forms. The computer-readable medium may include: any entity or device capable of carrying the computer program codes, recording medium, U disks, mobile hard disks, magnetic disks, optical disks, a computer memory, a read-only memory (ROM), a random access memory (RAM), electrical carrier signals, telecommunications signals, and software distribution medium. It should be noted that the content contained in the computer-readable medium may be appropriately added or deleted according to the requirements of the legislation and patent practice in jurisdiction. For example, in some jurisdictions, according to the legislation and patent practice, the computer-readable medium does not include electrical carrier signals and telecommunication signals.

It should be noted that for the foregoing method embodiments, for simplicity of description, the method is expressed as combinations of a series of actions, but those skilled in the art should know that the present disclosure is not limited by the described sequence of actions. According to the present disclosure, some steps may be performed in other order or at the same time. Further, those skilled in the art should also know that the embodiments described in the present disclosure are all preferred embodiments, and the involved actions and modules are not necessarily all required by the present disclosure.

In the above embodiments, the description of each embodiment has its own emphasis. For parts that are not described in detail in an embodiment, reference may be made to related descriptions of other embodiments.

The preferred embodiments of the present disclosure disclosed above are only used to help explain the present disclosure. The embodiments do not describe all the details in detail, nor do they limit the present disclosure to only the specific embodiments described. Apparently, many modifications and changes may be made according to the content of this specification. These embodiments are selected and described in the present disclosure in order to better explain the principles and practical applications of the present disclosure, so that those skilled in the art can understand and use the present disclosure well. The present disclosure is only limited by the claims and their full scope and equivalents.

The invention claimed is:

1. A container transporting method based on dense storage, comprising: at least one of a picking-up process and a return process, wherein the picking-up process comprises:

picking-up, in a case that at least one blocking container that blocks pickup of a target container is stored on a storage rack, the at least one blocking container from the storage rack by at least one robot and temporarily storing the at least one blocking container on a cache mechanism of the at least one robot, wherein the target container is one of at least one container to be picked up; and picking-up, by the at least one robot, the target container from the storage rack and storing the target container on a cache mechanism of the at least one robot, and picking-up the at least one blocking container from the cache mechanism of the at least one robot and placing the at least one blocking container at a placing-back position on the storage rack, wherein the placing-back position is chosen from an original storage position of the at least one blocking container, an original storage position of the target container, and other empty storage position; or picking-up, in a case that the cache mechanism of the at least one robot is entirely occupied by the at least one blocking container, the target container by the at least one robot from the storage rack and keeping the target container on the at least one robot; and the return process comprises:

placing, in a case that at least one blocking container that blocks return of a target container is stored on a storage rack, the at least one blocking container from an original storage position of the at least one blocking container on the storage rack to a position that is on the storage rack and does not form a block by at least one robot, wherein the target container is one of at least one container to be returned; and picking-up, by the at least one robot, the target container from the cache mechanism of the at least one robot and placing the target container at a return position on the storage rack, while the position of the blocking container remains unchanged.

2. The container transporting method according to claim 1, wherein the at least one robot comprises an individual robot.

3. The container transporting method according to claim 2, the picking-up process further comprising:

transporting, by the individual robot, the target container from a current position of the individual robot to a workstation through a robot passage, wherein in the case that the cache mechanism of the individual robot is entirely occupied by the at least one blocking container, the at least one blocking container and the target container are both transported from the current position of the individual robot to the workstation by the individual robot through the robot passage.

4. The method according to claim 1, wherein the at least one robot comprises at least one first robot and at least one second robot, the picking-up process specifically comprising:

picking-up, in a case that at least one blocking container that blocks pickup of a target container is stored on a storage rack, the at least one blocking container from the storage rack by a container pickup mechanism of the at least one first robot, wherein the target container is one of at least one container to be picked up;

moving the at least one first robot through a robot passage, or moving the at least one first robot to a cache position;

picking-up, by a container pickup mechanism of the at least one second robot, the target container from the storage rack, and transporting the target container from a current position of the at least one second robot to a workstation; and returning the at least one first robot to a position of the storage rack, and placing the at least one blocking container on the storage rack at an original storage position of the at least one blocking container, an original storage position of the target container or an empty storage position.

5. The method according to claim 4, wherein the picking-up the at least one blocking container from the storage rack by a container pickup mechanism of the at least one first robot comprises:

sequentially picking-up, in a case that the at least one first robot has a cache mechanism, the at least one blocking container from the storage rack by the container pickup mechanism of the at least one first robot, and sequentially storing the at least one blocking container on the cache mechanism of the at least one first robot until the cache mechanism of the at least one first robot is entirely occupied; and picking-up, in a case that none of the at least one first robot has a cache mechanism, one of the at least one blocking container from the storage rack by the container pickup mechanism of the at least one first robot and keeping the blocking container on the container pickup mechanism.

6. The method according to claim 4, wherein the picking-up, by a container pickup mechanism of the at least one second robot, the target container from the storage rack comprises:

picking-up, in a case that the at least one second robot has a cache mechanism, the target container from the storage rack by the container pickup mechanism of the at least one second robot and storing the target container on the cache mechanism of the at least one second robot; and picking-up, in a case that the second robot does not have a cache mechanism, the target container from the storage rack by the container pickup mechanism of the at least one second robot and keeping the target container on the container pickup mechanism.

7. The method according to claim 1, wherein the at least one robot comprises an individual robot, the return process specifically comprising:

placing, in a case that at least one blocking container that blocks return of a target container is stored on a storage rack, the at least one blocking container from an original storage position of the at least one blocking container on the storage rack to a position that does not form a block by a container pickup mechanism of the robot, wherein the target container is one of at least one container to be returned; and picking-up, by the container pickup mechanism of the robot, the target container from a cache mechanism of the robot and placing the target container at a return position on the storage rack.

8. The method according to claim 7, wherein the number of the at least one blocking container is one, and the placing the at least one blocking container from an original storage position of the blocking container on the storage rack to a position that does not form a block by a container pickup mechanism of a robot comprises:

placing, by the container pickup mechanism of the robot, the blocking container from the original storage position of the blocking container on the storage rack to an original storage position of the target container, wherein the picking-up, by the container pickup mechanism of the robot, the target container from a cache mechanism of the robot and placing the target container at a return position on the storage rack comprises:

picking-up, by the container pickup mechanism of the robot, the target container from the cache mechanism of the robot and placing the target container at the original storage position of the blocking container on the storage rack.

9. The method according to claim 7, wherein the number of the at least one blocking container is at least two, and the placing the at least one blocking container from an original storage position of the at least one blocking container on the storage rack to a position that does not form a block by a container pickup mechanism of a robot comprises:

sequentially translating, by the container pickup mechanism of the robot, the at least two blocking containers from an original storage position of the at least two blocking container on the storage rack by one storage position in a depth direction of the storage rack, wherein the picking-up, by the container pickup mechanism of the robot, the target container from a cache mechanism of the robot and placing the target container at a return position on the storage rack comprises:

picking-up, by the container pickup mechanism of the robot, the target container from the cache mechanism of the robot and placing the target container on the storage rack at an empty storage position among original storage positions of the at least two blocking containers.

10. The method according to claim 7, wherein the placing the at least one blocking container from an original storage position of the blocking container on the storage rack to a position that does not form a block by a container pickup mechanism of the robot comprises:

picking-up, by the container pickup mechanism of the robot, the at least one blocking container from the original storage position of the at least one blocking container on the storage rack and placing the blocking container on the cache mechanism of the robot;

wherein the picking-up, by the container pickup mechanism of the robot, the target container from a cache mechanism of the robot and placing the target container at a return position on the storage rack comprises:

picking-up, by the robot, the target container from the cache mechanism of the robot and placing the target container at an original storage position of the target container on the storage rack.

11. The method according to claim 10, wherein after the picking-up, by the container pickup mechanism of the robot, the target container from the cache mechanism of the robot and placing the target container at an original storage position of the target container on the storage rack, the method further comprises:

sequentially picking-up, by the container pickup mechanism of the robot, the at least one blocking container from the cache mechanism of the robot and sequentially placing the at least one blocking container at the original storage position of the blocking container on the storage rack.

12. The method according to claim 1, wherein the at least one robot comprises at least one first robot and at least one second robot, the return process specifically comprising:

picking-up, in a case that at least one blocking container that blocks return of a target container is stored on a storage rack, the at least one blocking container from the storage rack by a container pickup mechanism of the at least one first robot and placing the at least one blocking container at a position that does not form a block; and placing, by a container pickup mechanism of the at least one second robot carrying the target container, the target container at a return position on the storage rack.

13. The method according to claim 12, wherein the number of the at least one blocking container is one, and the number of the at least one first robot is one, and the picking-up the at least one blocking container from the storage rack by a container pickup mechanism of at least one first robot and placing the at least one blocking container at a position that does not form a block specifically comprises:

placing, by the container pickup mechanism of the first robot, the blocking container from an original storage position of the blocking container on the storage rack to an original storage position of the target container;

wherein the placing, by a container pickup mechanism of the at least one second robot carrying the target container, the target container at a return position on the storage rack comprises:

picking-up, in a case that the at least one second robot has a cache mechanism, the target container from the cache mechanism of the at least one second robot by the container pickup mechanism of the at least one second robot, and placing the target container at the original storage position of the blocking container on the storage rack; and directly placing, in a case that the at least one second robot does not have a cache mechanism and the target container is located on the container pickup mechanism of the at least one second robot, the target container at the original storage position of the blocking container on the storage rack by the container pickup mechanism of the at least one second robot.

14. The method according to claim 12, wherein the number of the at least one blocking container is at least two, the number of the at least one first robot is one, and the picking-up the at least one blocking container from the storage rack by a container pickup mechanism of at least one first robot and placing the at least one blocking container at a position that does not form a block comprises:

sequentially translating, by the container pickup mechanism of the first robot, the at least two blocking containers from an original storage position of the at least two blocking container on the storage rack by one storage position in a depth direction of the storage rack, wherein the placing, by a container pickup mechanism of the at least one second robot carrying the target container, the target container at a return position on the storage rack comprises:

picking-up, in a case that the at least one second robot has a cache mechanism, the target container from the cache mechanism of the at least one second robot by the container pickup mechanism of the at least one second robot, and placing the target container at one of original storage positions of the at least two blocking containers on the storage rack; and directly placing, in a case that the at least one second robot does not have a cache mechanism and the target container is located on the container pickup mechanism of the at least one second robot, the target container on an empty storage position among original storage positions of the at least two blocking containers on the storage rack by the container pickup mechanism of the at least one second robot.

15. The method according to claim 12, wherein the picking-up the at least one blocking container from the storage rack by a container pickup mechanism of the at least one first robot and placing the at least one blocking container at a position that does not form a block comprises:

picking-up, in a case that none of the at least one first robot has a cache mechanism, the at least one blocking container from the storage rack by the container pickup mechanism of a respective one of the at least one first robot and keeping the at least one blocking container on the container pickup mechanism of the at least one first robot; and picking-up, in a case that the at least one first robot has a cache mechanism, the at least one blocking container from the storage rack by the container pickup mechanism of a respective one of the at least one first robot and placing the at least one blocking container on the cache mechanism of the at least one first robot, wherein the placing, by a container pickup mechanism of the at least one second robot carrying the target container, the target container at a return position on the storage rack comprises:

picking-up, in a case that the at least one second robot has a cache mechanism, the target container from the cache mechanism of the second robot by the container pickup mechanism of the at least one second robot and placing the target container at an original storage position of the target container on the storage rack; and directly placing, in a case that the at least one second robot does not have a cache mechanism and the target container is located on the container pickup mechanism of the at least one second robot, the target container at the original storage position of the target container on the storage rack by the container pickup mechanism of the at least one second robot.

16. The method according to claim 12, wherein after the placing the target container at the original storage position of the target container on the storage rack by the container pickup mechanism of the at least one second robot, the method further comprises:

placing, in a case that none of the at least one first robot has a cache mechanism, the at least one blocking container on the storage rack at an original storage position of the at least one blocking container or an empty storage position by the container pickup mechanism of a respective one of the at least one first robot; and picking-up, in a case that the at least one first robot has a cache mechanism, the at least one blocking container from the cache mechanism of a respective one of the at least one first robot by the container pickup mechanism of the at least one first robot and placing the at least one blocking container on the storage rack at the original storage position of the at least one blocking container or an empty storage position.

17. The method according to claim 1, further comprising:

recording, in a case that a position of the target container changes, a new storage position of the target container and updating a correspondence between the new storage position of the target container and an identity of the target container; and recording, in a case that a position of the at least one blocking container changes, a new storage position of the at least one blocking container and updating a correspondence between the new storage position of the at least one blocking container and an identity of the at least one blocking container.

18. A computer-readable medium storing computer-readable instructions to achieve a container transporting method based on dense storage according to claim 1.

19. An electronic device, comprising:

at least one memory and at least one processor;

the at least one memory storing computer-readable instructions, and the at least one processor is used to execute the computer-readable instructions, wherein, the at least one processor executes the computer-readable instructions to achieve a container transporting method based on dense storage, the method comprising at least one of a picking-up process and a return process, wherein the picking-up process comprises:

picking-up, in a case that at least one blocking container that blocks pickup of a target container is stored on a storage rack, the at least one blocking container from the storage rack by at least one robot and temporarily storing the at least one blocking container on a cache mechanism of the at least one robot, wherein the target container is one of at least one container to be picked up; and picking-up, by the at least one robot, the target container from the storage rack and storing the target container on a cache mechanism of the at least one robot, and picking-up the at least one blocking container from the cache mechanism of the at least one robot and placing the at least one blocking container at a placing-back position on the storage rack, wherein the placing-back position is chosen from an original storage position of the at least one blocking container, an original storage position of the target container, and other empty storage position; or picking-up, in a case that the cache mechanism of the at least one robot is entirely occupied by the at least one blocking container, the target container by the at least one robot from the storage rack and keeping the target container on the at least one robot; and the return process comprises:

placing, in a case that at least one blocking container that blocks return of a target container is stored on a storage rack, the at least one blocking container from an original storage position of the at least one blocking container on the storage rack to a position that is on the storage rack and does not form a block by at least one robot, wherein the target container is one of at least one container to be returned; and picking-up, by the at least one robot, the target container from the cache mechanism of the at least one robot and placing the target container at a return position on the storage rack, while the position of the blocking container remains unchanged.

20. A container transporting system based on dense storage, wherein the system comprises at least one robot, the at least one robot performs at least one of a picking-up process and a return process, wherein the picking-up process comprises:

picking-up, in a case that at least one blocking container that blocks pickup of a target container is stored on a storage rack, the at least one blocking container from the storage rack by at least one robot and temporarily storing the at least one blocking container on a cache mechanism of the at least one robot, wherein the target container is one of at least one container to be picked up; and picking-up, by the at least one robot, the target container from the storage rack and storing the target container on a cache mechanism of the at least one robot, and picking-up the at least one blocking container from the cache mechanism of the at least one robot and placing the at least one blocking container at a placing-back position on the storage rack, wherein the placing-back position is chosen from an original storage position of the at least one blocking container, an original storage position of the target container, and other empty storage position; or picking-up, in a case that the cache mechanism of the at least one robot is entirely occupied by the at least one blocking container, the target container by the at least one robot from the storage rack and keeping the target container on the at least one robot; and the return process comprises:

placing, in a case that at least one blocking container that blocks return of a target container is stored on a storage rack, the at least one blocking container from an original storage position of the at least one blocking container on the storage rack to a position that is on the storage rack and does not form a block by at least one robot, wherein the target container is one of at least one container to be returned; and picking-up, by the at least one robot, the target container from the cache mechanism of the at least one robot and placing the target container at a return position on the storage rack, while the position of the blocking container remains unchanged.

* * * * *